United States Patent
Chang

(10) Patent No.: US 12,534,572 B2
(45) Date of Patent: Jan. 27, 2026

(54) RESIN COMPOSITION AND ARTICLE MADE THEREFROM

(71) Applicant: Elite Material Co., Ltd., Taoyuan (TW)

(72) Inventor: Shu-Hao Chang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 792 days.

(21) Appl. No.: 17/881,299

(22) Filed: Aug. 4, 2022

(65) Prior Publication Data

US 2024/0010791 A1 Jan. 11, 2024

(30) Foreign Application Priority Data

Jul. 7, 2022 (TW) .................. 111125567

(51) Int. Cl.
| | |
|---|---|
| *C08G 65/48* | (2006.01) |
| *C08G 73/10* | (2006.01) |
| *C08J 5/18* | (2006.01) |
| *C08J 5/24* | (2006.01) |
| *C08K 3/36* | (2006.01) |
| *C08K 3/38* | (2006.01) |
| *C08K 5/057* | (2006.01) |
| *C08K 5/159* | (2006.01) |
| *C08K 5/544* | (2006.01) |

(52) U.S. Cl.
CPC ........... *C08G 65/485* (2013.01); *C08G 73/10* (2013.01); *C08J 5/18* (2013.01); *C08J 5/24* (2013.01); *C08K 3/36* (2013.01); *C08K 3/38* (2013.01); *C08K 5/057* (2013.01); *C08K 5/159* (2013.01); *C08K 5/544* (2013.01); *C08G 2650/04* (2013.01); *C08K 2003/385* (2013.01)

(58) Field of Classification Search
None
See application file for complete search history.

(56) References Cited

U.S. PATENT DOCUMENTS

| | | | |
|---|---|---|---|
| 5,468,791 A * | 11/1995 | Yuan ..................... | C09D 167/00 |
| | | | 428/458 |
| 2020/0071477 A1* | 3/2020 | Liu ....................... | C08K 5/0066 |
| 2021/0355259 A1* | 11/2021 | Liu ........................ | B32B 15/20 |

OTHER PUBLICATIONS

DeArmitt C., et al., (Dispersants and Coupling Agents Applied Plastics Engineering Handbook Processing and Materials Plastics Design Library,2011, 441-454) (Year: 2011).*

* cited by examiner

*Primary Examiner* — Robert S Jones, Jr.
*Assistant Examiner* — Lily K Sloan
(74) *Attorney, Agent, or Firm* — MUNCY, GEISSLER, OLDS & LOWE, P.C.

(57) ABSTRACT

A resin composition includes 120 parts by weight of a vinyl group-containing polyphenylene ether resin, 5 parts by weight to 10 parts by weight of a compound of Formula (1), 15 parts by weight to 25 parts by weight of a compound of Formula (2), and 70 parts by weight to 110 parts by weight of an inorganic filler. The resin composition may be used to make various articles, such as a prepreg, a resin film, a laminate or a printed circuit board, and at least one of the following properties can be improved, including difference rate of dissipation factor, gel time stability and stickiness.

9 Claims, No Drawings

RESIN COMPOSITION AND ARTICLE MADE THEREFROM

CROSS-REFERENCE TO RELATED APPLICATION

This application claims the priority benefits of Taiwan Patent Application No. 111125567, filed on Jul. 7, 2022. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

With the miniaturization of electronic components, the development of multi-layer boards is also moving towards the direction of high performance circuits. Therefore, the demand for high density trace and high trace capacity is increasing, and the requirements for electrical properties are also becoming more stringent. Therefore, the industry enthusiastically expects to have a material that can maintain excellent dissipation factor after multiple build-up and lamination processes of multi-layer boards. On the other hand, in order to prevent the prepreg from affecting the properties of the laminate due to the long storage time, it is also necessary to develop a material with long-term storage stability at the same time.

SUMMARY

To overcome the problems facing prior arts, particularly one or more of the above-mentioned technical problems of conventional materials, it is a primary object of the present disclosure to provide a resin composition and an article made therefrom which may overcome at least one of the above-mentioned technical problems.

To achieve the above-mentioned object, the present disclosure provides a resin composition, comprising 120 parts by weight of a vinyl group-containing polyphenylene ether resin, 5 parts by weight to 10 parts by weight of a compound of Formula (1), 15 parts by weight to 25 parts by weight of a compound of Formula (2), and 70 parts by weight to 110 parts by weight of an inorganic filler,

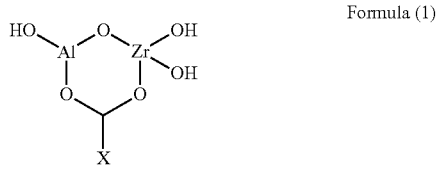

Formula (1)

wherein X is —(CH$_2$)$_n$CH$_3$ or —C(CH$_3$)=CH$_2$, and n is 13;

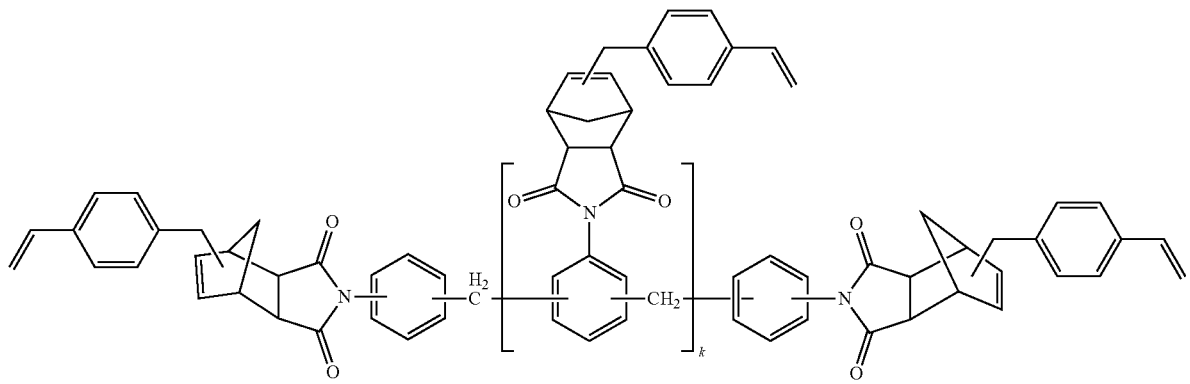

Formula (2)

wherein k is an integer of 1 to 10.

For example, in one embodiment, the vinyl group-containing polyphenylene ether resin comprises a vinylbenzyl group-containing biphenyl polyphenylene ether resin, a methacrylate group-containing polyphenylene ether resin or a combination thereof.

For example, in one embodiment, the inorganic filler comprises chemically synthesized silica, fused silica, boron nitride or a combination thereof.

For example, in one embodiment, the resin composition further comprises bis(vinylphenyl)ethane (BVPE), maleimide resin or a combination thereof.

For example, in one embodiment, the resin composition further comprises curing accelerator, flame retardant, polymerization inhibitor, solvent, coloring agent, toughening agent or a combination thereof.

To achieve the above-mentioned objects, the present disclosure further provides an article made from the resin composition, including a prepreg, a resin film, a laminate or a printed circuit board.

For example, in one embodiment, articles made from the resin composition disclosed herein at least have one, more or all of the following properties:

- a difference rate of dissipation factor of less than or equal to 4.1% calculated according to a dissipation factor as measured by reference to IPC-TM-650 2.5.5.13 at 10 GHz;
- a gel time stability calculated according to a gel time as measured by reference to IPC-TM-650 2.3.18 of less than or equal to 18 seconds; and
- passing a level 1 stickiness test (i.e., one of two superimposed prepregs is peeled off from the other prepreg by gravity within 0-3 seconds without powder falling).

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s).

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, an oligomer, etc., but not limited thereto. Unless otherwise specified, according to the present disclosure, the homopolymer refers to a polymer formed by polymerizing one kind of monomer. Unless otherwise specified, according to the present disclosure, the copolymer refers to a product formed by subjecting two or more kinds of monomers to a polymerization reaction. For example, copolymers may comprise:

random copolymers, such as a structure of -AABABB-BAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, according to the present disclosure, the styrene-butadiene-styrene block copolymer refers to a polymer obtained by subjecting styrene monomers and butadiene monomers to a copolymerization. In the present disclosure, as long as the styrene-butadiene-styrene block copolymer is a block copolymer having this structure (containing styrene units at terminals and containing butadiene units in the middle), whether the units of the polymer main chain skeleton and side chain are modified or not is not particularly limited. In other words, the copolymer of the present disclosure may be modified, such as by maleic anhydride. Unless otherwise specified, according to the present disclosure, the prepolymer refers to a polymer having a lower molecular weight between the molecular weight of monomer and the molecular weight of final polymer, and the prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, according to the present disclosure, a modification comprises a product derived from a resin with its reactive functional group modified, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

As used herein, "vinyl group-containing" refers to the presence of a reactive ethylenic carbon-carbon double bond (C═C) or a functional group derived therefrom in a compound. Therefore, examples of "vinyl group-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, an allyl group, a vinylbenzyl group, a methacrylate group or the like, but not limited thereto.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin. If a resinous solution comprises solvent and resin, the part by weight of (solid or liquid) resin generally refers to the weight unit of the (solid or liquid) resin, not including the weight unit of the solvent in the solution, and the part by weight of the solvent refers to the weight unit of the solvent.

The following embodiments and examples are illustrative in nature and are not intended to limit the present disclosure and its application. In addition, the present disclosure is not bound by any theory described in the background and summary above or the following embodiments or examples.

As described above, it is a primary object of the present disclosure to provide a resin composition, comprising 120 parts by weight of a vinyl group-containing polyphenylene ether resin, 5 parts by weight to 10 parts by weight of a compound of Formula (1), 15 parts by weight to 25 parts by weight of a compound of Formula (2), and 70 parts by weight to 110 parts by weight of an inorganic filler,

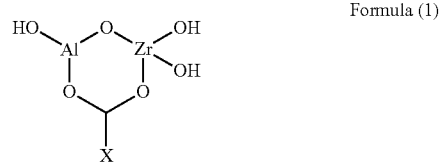

Formula (1)

wherein X is —(CH$_2$)$_n$CH$_3$ or —C(CH$_3$)═CH$_2$, and n is 13;

Formula (2)

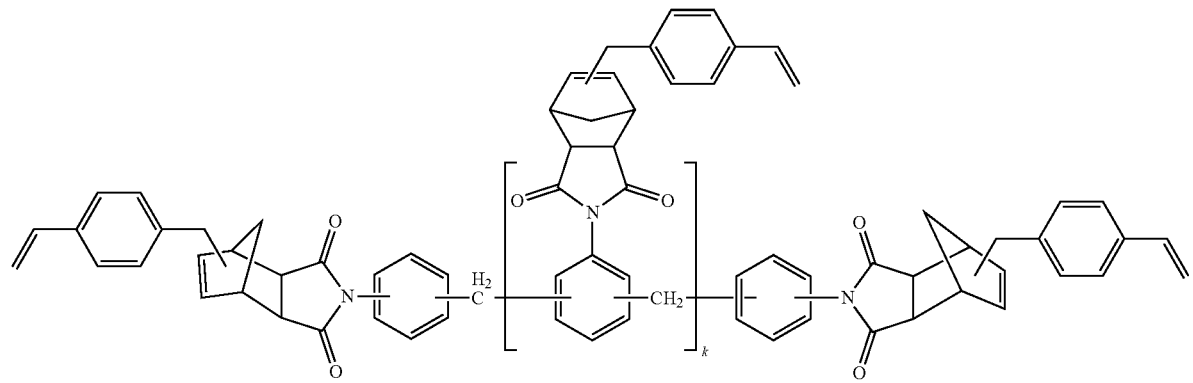

wherein k is an integer of 1 to 10.

For example, in one embodiment, the vinyl group-containing polyphenylene ether resin may comprise various vinyl group-containing polyphenylene ether resins known in the art to which this disclosure pertains. The vinyl group-containing polyphenylene ether resin suitable for the present disclosure is not particularly limited and may comprise any one or more commercially available products, self-prepared products, or a combination thereof. Examples of the vinyl group-containing polyphenylene ether resin may include but not limited to a polyphenylene ether resin containing a vinyl group, an allyl group, a vinylbenzyl group or a methacrylate group. For example, in one embodiment, the vinyl group-containing polyphenylene ether resin comprises a vinylbenzyl group-containing biphenyl polyphenylene ether resin, a methacrylate group-containing polyphenylene ether resin (i.e., methacryloyl group-containing polyphenylene ether resin), an allyl group-containing polyphenylene ether resin, a vinylbenzyl group-containing bisphenol A polyphenylene ether resin, a chain-extended vinyl group-containing polyphenylene ether resin or a combination thereof. For example, the vinyl group-containing polyphenylene ether resin may be a vinylbenzyl group-containing biphenyl polyphenylene ether resin with a number average molecular weight of about 1200 (such as OPE-2st 1200, available from Mitsubishi Gas Chemical Co., Inc.), a vinylbenzyl group-containing biphenyl polyphenylene ether resin with a number average molecular weight of about 2200 (such as OPE-2st 2200, available from Mitsubishi Gas Chemical Co., Inc.), a methacrylate group-containing polyphenylene ether resin with a number average molecular weight of about 1900 to 2300 (such as SA9000, available from Sabic), a vinylbenzyl group-containing bisphenol A polyphenylene ether resin with a number average molecular weight of about 2400 to 2800, a chain-extended vinyl group-containing polyphenylene ether resin with a number average molecular weight of about 2200 to 3000, or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

Unless otherwise specified, the compound of Formula (1) may be dissolved in various solvents, such as but not limited to ethylene glycol, propylene glycol, dipropylene glycol or a combination thereof.

In the resin composition of the present disclosure, relative to 120 parts by weight of the vinyl group-containing polyphenylene ether resin, the amount of the compound of Formula (1) may range from 5 parts by weight to 10 parts by weight, such as but not limited to 5 parts by weight, 6 parts by weight, 7 parts by weight, 8 parts by weight, 9 parts by weight or 10 parts by weight of the compound of Formula (1). For example, the resin composition may comprise 120 parts by weight of a vinyl group-containing polyphenylene ether resin and 6 parts by weight of a compound of Formula (1).

In the resin composition of the present disclosure, relative to 120 parts by weight of the vinyl group-containing polyphenylene ether resin, the amount of the compound of Formula (2) may range from 15 parts by weight to 25 parts by weight, such as but not limited to 15 parts by weight, 16 parts by weight, 18 parts by weight, 20 parts by weight, 22 parts by weight, 24 parts by weight or 25 parts by weight of the compound of Formula (2). For example, the resin composition may comprise 120 parts by weight of a vinyl group-containing polyphenylene ether resin and 20 parts by weight of a compound of Formula (2).

As used herein, unless otherwise specified, the compound of Formula (1) may be present as any form in the resin composition. For example, according to one embodiment of the present disclosure, the compound of Formula (1) may be directly added (without performing any reaction in advance) to the resin composition. For example, according to another embodiment of the present disclosure, the compound of Formula (1) may be pre-reacted with an inorganic filler to obtain an inorganic filler pretreated by the compound of Formula (1), which is then added to the resin composition. In other words, as used herein, the compound of Formula (1) may be present as the form of modifier, pretreatment agent or coupling agent of the inorganic filler in the resin composition. Unless otherwise specified, the method of pretreating an inorganic filler with the compound of Formula (1) as modifier, pretreatment agent or coupling agent may refer to the conventional methods of surface pretreatment of an inorganic filler with various modifiers, pretreatment agents or coupling agents (e.g., silane coupling agents).

For example, in one embodiment, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, zirconium tungstate, petaliteor, calcined kaolin or a combination thereof. Moreover, the inorganic filler can be spherical, fibrous, plate-like, particulate, flake-like or whisker-like in shape and can be optionally pretreated by a silane coupling agent.

For example, in one embodiment, the inorganic filler may comprise chemically synthesized silica, fused silica, boron nitride or a combination thereof.

Unless otherwise specified, the chemically synthesized silica refers to the silica obtained by a chemical synthesis process, which generally involves subjecting a silicon source and other reactants to a chemical reaction under properly controlled conditions so as to obtain the chemically synthesized silica. For example, the chemically synthesized silica may comprise microemulsion synthesized silica, vaporized metal combustion synthesized silica or a combination thereof, but not limited thereto. Other synthesis steps and conditions suitable for preparing the chemically synthesized silica of the present disclosure may be ascertained by a skilled person in the art without undue experimentation.

For example, in one embodiment, the chemically synthesized silica comprises microemulsion synthesized silica, vaporized metal combustion synthesized silica or a combination thereof.

For example, in one embodiment, the boron nitride comprises a spherical boron nitride agglomerate formed by agglomeration of common boron nitrides, such as a spherical boron nitride agglomerate formed by agglomeration of flaky hexagonal boron nitrides.

In the resin composition of the present disclosure, relative to 120 parts by weight of the vinyl group-containing polyphenylene ether resin, the amount of the inorganic filler may range from 70 parts by weight to 110 parts by weight, such as but not limited to 70 parts by weight, 80 parts by weight, 90 parts by weight, 100 parts by weight or 110 parts by weight of the inorganic filler. For example, the resin composition may comprise 120 parts by weight of a vinyl group-containing polyphenylene ether resin and 80 parts by weight of an inorganic filler.

In other words, in the resin composition of the present disclosure, relative to 120 parts by weight of the vinyl group-containing polyphenylene ether resin, the amount of the compound of Formula (1) may range from 5 parts by weight to 10 parts by weight, the amount of the compound of Formula (2) may range from 15 parts by weight to 25 parts by weight, and the amount of the inorganic filler may range from 70 parts by weight to 110 parts by weight.

In addition to the aforesaid vinyl group-containing polyphenylene ether resin, the compound of Formula (1), the compound of Formula (2) and the inorganic filler, the resin composition of the present disclosure may optionally further comprise bis(vinylphenyl)ethane. For example, in one embodiment, relative to 120 parts by weight of the vinyl group-containing polyphenylene ether resin, the resin composition of the present disclosure may further comprise 5 parts by weight to 10 parts by weight of bis(vinylphenyl) ethane.

For example, the bis(vinylphenyl)ethane includes but not limited to 1,2-bis(4-vinylphenyl)ethane, 1,2-(3-vinylphenyl-4-vinylphenyl)ethane, 1,2-bis(3-vinylphenyl)ethane or a combination thereof.

In addition to the aforesaid vinyl group-containing polyphenylene ether resin, the compound of Formula (1), the compound of Formula (2) and the inorganic filler, the resin composition of the present disclosure may optionally further comprise a maleimide resin, wherein the amount of the maleimide resin is not particularly limited. For example, in one embodiment, relative to 120 parts by weight of the vinyl group-containing polyphenylene ether resin, the resin composition of the present disclosure may further comprise 14 parts by weight to 20 parts by weight of a maleimide resin.

For example, in one embodiment, the maleimide resin comprises a monomer containing at least one maleimide group or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, the maleimide resin includes 4,4'-diphenylmethane bismaleimide, oligomer of phenylmethane maleimide (a.k.a. polyphenylmethane maleimide), bisphenol A diphenyl ether bismaleimide, 3,3'-dimethyl-5,5'-diethyl-4,4'-diphenylmethane bismaleimide (a.k.a. bis(3-ethyl-5-methyl-4-maleimidephenyl)methane), 3,3'-dimethyl-5,5'-dipropyl-4,4'-diphenylmethane bismaleimide, biphenyl maleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, diethyl bismaleimidotoluene, vinyl benzyl maleimide (VBM), maleimide resin containing aliphatic long chain structure, or a combination thereof. Unless otherwise specified, the maleimide resins described above should be construed as including the modifications thereof.

For example, examples of the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry, products such as BMI-70 and BMI-80 available from K.I Chemical Industry Co., Ltd., products such as MIR-3000 and MIR-5000 available from Nippon Kayaku, or products such as DE-TDAB available from Evonik Industries.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

Unless otherwise specified, the resin composition of the present disclosure may optionally further comprise curing accelerator, flame retardant, polymerization inhibitor, solvent, coloring agent, toughening agent or a combination thereof. For example, the amount of the aforesaid components may range from 0.01 part by weight to 450 parts by weight, such as but not limited to 0.01 part by weight to 3 parts by weight, 30 parts by weight to 80 parts by weight, 50 parts by weight to 300 parts by weight or 250 parts by weight to 450 parts by weight.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl) benzene or a combination thereof. For example, in one embodiment, relative to 120 parts by weight of the vinyl group-containing polyphenylene ether resin, the resin composition of the present disclosure may further comprise 0.5 part by weight to 1.0 part by weight of a curing accelerator.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac). Unless otherwise specified, the amount of the aforesaid flame retardant is not particularly limited.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis (4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxopiperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol monomethyl ether acetate, or a mixture thereof. The amount of solvent is not particularly limited and may be adjusted according to the viscosity required for the resin composition.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg is 130° C. to 150° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 190° C. and 210° C., a suitable curing time being 120 to 180 minutes, and a suitable pressure being between 400 psi and 600 psi. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition of the present disclosure or the article made therefrom may achieve improvement in one or more of the following properties: difference rate of dissipation factor, gel time stability and stickiness.

For example, the resin composition according to the present disclosure or the article made therefrom may achieve one, more or all of the following properties:
  a difference rate of dissipation factor of less than or equal to 4.1% calculated according to a dissipation factor as measured by reference to IPC-TM-650 2.5.5.13 at 10 GHz, such as between 1.6% and 4.1% or between 1.6% and 2.1%;
  a gel time stability calculated according to a gel time as measured by reference to IPC-TM-650 2.3.18 of less than or equal to 18 seconds, such as between 1 second and 18 seconds; and
  passing a level 1 stickiness test (i.e., one of two superimposed prepregs is peeled off from the other prepreg by gravity within 0-3 seconds without powder falling).

Raw materials below were used to prepare the resin compositions of various Examples and Comparative Examples of the present disclosure according to the amount listed in Table 1 to Table 4 and further fabricated to prepare test samples.

Materials and reagents used in Examples and Comparative Examples disclosed herein are listed below:
  SA9000: methacrylate group-containing polyphenylene ether resin, available from Sabic.

OPE-2st 1200: vinylbenzyl group-containing biphenyl polyphenylene ether resin, available from Mitsubishi Gas Chemical Co., Inc.

OPE-2st 2200: vinylbenzyl group-containing biphenyl polyphenylene ether resin, available from Mitsubishi Gas Chemical Co., Inc.

BMI-80: bisphenol A diphenyl ether bismaleimide resin, available from K.I Chemical Industry Co., Ltd.

BMI-2300: phenylmethane maleimide oligomer, available from Daiwakasei Industry.

BMI-3000: maleimide resin containing aliphatic long-chain structure, available from Designer Molecules Inc.

X1: a compound of Formula (3), ethylene glycol as solvent, available from Chartwell,

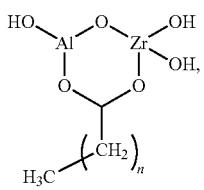

Formula (3)

wherein n is 13.

X2: a compound of Formula (4), ethylene glycol as solvent, available from Chartwell,

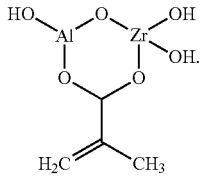

Formula (4)

X3: a compound of Formula (3), propylene glycol as solvent, available from Chartwell,

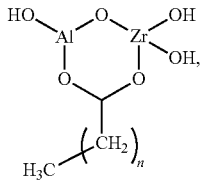

Formula (3)

wherein n is 13.

X4: a compound of Formula (3), dipropylene glycol as solvent, available from Chartwell,

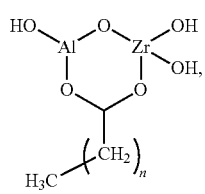

Formula (3)

wherein n is 13.

KBM-573: amino group-containing silane coupling agent, available from Shin-Etsu Chemical Co., Ltd.

KBM-903: amino group-containing silane coupling agent, available from Shin-Etsu Chemical Co., Ltd.

KBM-1003: vinyl group-containing silane coupling agent, available from Shin-Etsu Chemical Co., Ltd.

X5: a compound of Formula (2), wherein k is an integer of 1 to 10, available from Shin-Etsu Chemical Co., Ltd.

X6: 4-vinylbenzyl group-substituted cyclopentadiene, prepared by Preparation Example 1.

TAIC: triallyl isocyanurate, commercially available.

BANI-M: a compound of Formula (5), available from Maruzen Petrochemical Co., Ltd.

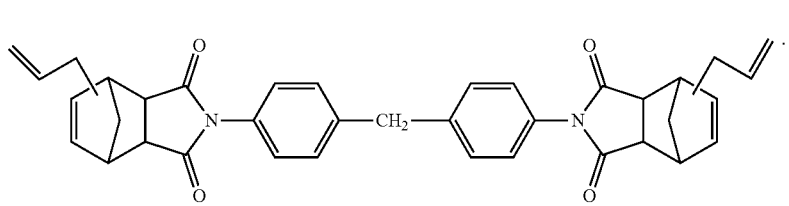

Formula (5)

BVPE: bis(vinylphenyl)ethane, available from Linchuan Chemical Co., Ltd.

25B: 2,5-dimethyl-2,5-di(tert-butylperoxy)-3-hexyne, available from NOF Corporation.

SC2050 SMJ: chemically synthesized silica, surface treated by methacrylate siloxane, available from Admatechs.

525: fused silica, available from SIBELCO.

CFP007ST: boron nitride, available from 3M.

Mixed solvent: a mixture of toluene and methyl ethyl ketone (MEK), having a weight ratio of toluene to methyl ethyl ketone of 4:1, prepared by Applicant.

In the Tables, Y represents the total parts by weight of the amount symbols A, B, C, D, E and F.

Preparation Example 1

After washing 17.5 g of sodium hydride with hexane, the residue was cooled to 5° C. under nitrogen atmosphere and then added with a total of 44 g of cyclopentadiene in several times. Afterwards, the temperature was increased to 60° C., and the mixture was added with a total of 100 g of 4-vinylbenzyl chloride, then added with 150 g of deionized water and stirred for at least 30 minutes, and then washed with 10 wt % aqueous hydrochloric acid and deionized water. The organic phase was separated and dried with sodium sulfate, and the solvent was removed to obtain 4-vinylbenzyl group-substituted cyclopentadiene.

Compositions and test results of resin compositions of Examples and Comparative Examples are listed below (in part by weight):

TABLE 1

Resin compositions of Examples (in part by weight) and test results

| Component | Name | Amount symbol | E1 | E2 | E3 | E4 | E5 | E6 | E7 |
|---|---|---|---|---|---|---|---|---|---|
| vinyl group-containing polyphenylene ether resin | SA9000 | A | 120 | | 120 | 120 | | 120 | 120 |
| | OPE-2st 1200 | | | 120 | | | 60 | | |
| | OPE-2st 2200 | | | | | | 60 | | |
| maleimide resin | BMI-80 | B | | | | | | | |
| | BMI-2300 | | | | | | | | |
| | BMI-3000 | | | | | | | | |
| compound of Formula (1) | X1 | C | 6 | | | | | 6 | 5 | 10 |
| | X2 | | | 6 | | | | | |
| | X3 | | | | 6 | | | | |
| | X4 | | | | | 6 | | | |
| coupling agent | KBM-573 | | | | | | | | |
| | KBM-903 | | | | | | | | |
| | KBM-1003 | | | | | | | | |
| compound of Formula (2) | X5 | D | 20 | 20 | 20 | 20 | 20 | 20 | 20 |
| additive | X6 | | | | | | | | |
| | TAIC | | | | | | | | |
| | BANI-M | | | | | | | | |
| bis(vinylphenyl)ethane | BVPE | E | | | | | | | |
| curing accelerator | 25B | F | 1 | 1 | 1 | 1 | 1 | 1 | 1 |
| inorganic filler | SC2050 SMJ 525 | — | 80 | 80 | 80 | 80 | 80 | 80 | 80 |
| | CFP007ST | | | | | | | | |
| solvent | toluene:MEK = 4:1 | — | Y*1.25 | Y*1.25 | Y*1.25 | Y*1.25 | Y*1.25 | Y*1.25 | Y*1.25 |

| Property | Unit | E1 | E2 | E3 | E4 | E5 | E6 | E7 |
|---|---|---|---|---|---|---|---|---|
| Df1 | — | 0.00195 | 0.00215 | 0.00196 | 0.00194 | 0.00209 | 0.00193 | 0.00198 |
| Df2 | — | 0.00202 | 0.00222 | 0.00203 | 0.00201 | 0.00217 | 0.00200 | 0.00204 |
| difference rate of dissipation factor | % | 3.6% | 3.3% | 3.6% | 3.6% | 3.8% | 3.6% | 3.0% |
| S/G1 | second | 160 | 140 | 160 | 160 | 145 | 160 | 155 |
| S/G2 | second | 155 | 128 | 155 | 155 | 130 | 156 | 150 |
| gel time stability | second | 5 | 12 | 5 | 5 | 15 | 4 | 5 |
| stickiness | — | LV1 | LV1 | LVI | LVI | LV1 | LVI | LV1 |

TABLE 2

Resin compositions of Examples (in part by weight) and test results

| Component | Name | Amount symbol | E8 | E9 | E10 | E11 | E12 | E13 | E14 |
|---|---|---|---|---|---|---|---|---|---|
| vinyl group-containing polyphenylene ether resin | SA9000 | A | 120 | 120 | 120 | 120 | 120 | 90 | 100 |
| | OPE-2st 1200 | | | | | | | 15 | 8 |
| | OPE-2st 2200 | | | | | | | 15 | 12 |
| maleimide resin | BMI-80 | B | | | | | | 10 | 6 |
| | BMI-2300 | | | | | | | 5 | 4 |
| | BMI-3000 | | | | | | | 5 | 4 |
| compound of Formula (1) | X1 | C | 6 | 6 | 6 | 6 | 6 | 3 | 2 |
| | X2 | | | | | | | 2 | 3 |
| | X3 | | | | | | | 1 | |
| | X4 | | | | | | | | 1 |
| coupling agent | KBM-573 | | | | | | | | |
| | KBM-903 | | | | | | | | |
| | KBM-1003 | | | | | | | | |

TABLE 2-continued

Resin compositions of Examples (in part by weight) and test results

| | | | | | | | | | |
|---|---|---|---|---|---|---|---|---|---|
| compound of Formula (2) | X5 | D | 15 | 25 | 20 | 20 | 20 | 20 | 22 |
| additive | X6 | | | | | | | | |
| | TAIC | | | | | | | | |
| | BANI-M | | | | | | | | |
| bis(vinylphenyl) ethane | BVPE | E | | | 5 | 10 | | | 6 |
| curing accelerator | 25B | F | 1 | 1 | 1 | 1 | 1 | 0.7 | 0.5 |
| inorganic filler | SC2050 SMJ 525 | — | 80 | 80 | 80 | 80 | 80 | 40 10 | 95 5 |
| | CFP007ST | | | | | | | 20 | 10 |
| solvent | toluene:MEK = 4:1 | — | Y*1.25 | Y*1.25 | Y*1.25 | Y*1.25 | Y*1.25 | Y*1.0 | Y*1.5 |

| Property | Unit | E8 | E9 | E10 | E11 | E12 | E13 | E14 |
|---|---|---|---|---|---|---|---|---|
| Df1 | — | 0.00196 | 0.00194 | 0.00192 | 0.00191 | 0.00275 | 0.00206 | 0.00199 |
| Df2 | — | 0.00204 | 0.00200 | 0.00196 | 0.00194 | 0.00282 | 0.00211 | 0.00203 |
| difference rate of dissipation factor | % | 4.1% | 3.1% | 2.1% | 1.6% | 2.5% | 2.4% | 2.0% |
| S/G1 | second | 165 | 155 | 150 | 145 | 182 | 160 | 160 |
| S/G2 | second | 164 | 145 | 141 | 127 | 175 | 158 | 158 |
| gel time stability | second | 1 | 10 | 9 | 18 | 7 | 2 | 2 |
| stickiness | — | LV1 | LV1 | LV1 | LV1 | LV1 | LV1 | LV1 |

25

TABLE 3

Resin compositions of Comparative Examples (in part by weight) and test results

| Component | Name | Amount symbol | C1 | C2 | C3 | C4 | C5 | C6 | C7 |
|---|---|---|---|---|---|---|---|---|---|
| vinyl group-containing polyphenylene ether resin | SA9000 | A | 120 | 120 | 120 | | 120 | 120 | 120 |
| | OPE-2st 1200 | | | | | | | | |
| | OPE-2st 2200 | | | | | | | | |
| maleimide resin | BMI-80 | B | | | | | | | |
| | BMI-2300 | | | | | | | 20 | 10 |
| | BMI-3000 | | | | | | | | |
| compound of Formula (1) | X1 | C | | | | | 5 | 5 | 5 |
| | X2 | | | | | | | | |
| | X3 | | | | | | | | |
| | X4 | | | | | | | | |
| coupling agent | KBM-573 | | | | 5 | | | | |
| | KBM-903 | | | | | 5 | | | |
| | KBM-1003 | | | | | | 5 | | |
| compound of Formula (2) | X5 | D | 20 | 20 | 20 | 20 | | | |
| additive | X6 | | | | | | | | 10 |
| | TAIC | | | | | | | | |
| | BANI-M | | | | | | | | |
| bis(vinylphenyl) ethane | BVPE | E | | | | | | | |
| curing accelerator | 25B | F | 1 | 1 | 1 | 1 | 1 | 1 | 1 |
| inorganic filler | SC2050 SMJ 525 | — | 80 | 80 | 80 | 80 | 80 | 80 | 80 |
| | CFP007ST | | | | | | | | |
| solvent | toluene:MEK = 4:1 | — | Y*1.25 | Y*1.25 | Y*1.25 | Y*1.25 | Y*1.25 | Y*1.25 | Y*1.25 |

| Property | Unit | C1 | C2 | C3 | C4 | C5 | C6 | C7 |
|---|---|---|---|---|---|---|---|---|
| Df1 | — | 0.00196 | 0.00201 | 0.00207 | 0.00204 | 0.00215 | 0.00236 | 0.00214 |
| Df2 | — | 0.00218 | 0.00223 | 0.00228 | 0.00227 | 0.00261 | 0.00278 | 0.00267 |
| difference rate of dissipation factor | % | 11.2% | 10.9% | 10.1% | 11.3% | 21.4% | 17.8% | 24.8% |
| S/G1 | second | 155 | 155 | 160 | 155 | 230 | 155 | 150 |
| S/G2 | second | 143 | 142 | 154 | 141 | 229 | 143 | 139 |
| gel time stability | second | 12 | 13 | 6 | 14 | 1 | 12 | 11 |
| stickiness | — | LV1 | LV1 | LV1 | LV1 | LV5 | LV1 | LV3 |

TABLE 4

Resin compositions of Comparative Examples (in part by weight) and test results

| Component | Name | Amount symbol | C8 | C9 | C10 | C11 | C12 | C13 | C14 |
|---|---|---|---|---|---|---|---|---|---|
| vinyl group-containing polyphenylene ether resin | SA9000 OPE-2st 1200 OPE-2st 2200 | A | 120 | 120 | 120 | 120 | 120 | 120 | 120 |
| maleimide resin | BMI-80 BMI-2300 BMI-3000 | B | | 8 | | | | | |
| compound of Formula (1) | X1 X2 X3 X4 | C | 5 | 5 | 5 | 2 | 12 | 5 | 5 |
| coupling agent | KBM-573 KBM-903 KBM-1003 | | | | | | | | |
| compound of Formula (2) | X5 | D | | | | 20 | 20 | 10 | 30 |
| additive | X6 TAIC BANI-M | | 16 | 20 | 20 | | | | |
| bis(vinylphenyl) ethane | BVPE | E | | | | | | | |
| curing accelerator | 25B | F | 1 | 1 | 1 | 1 | 1 | 1 | 1 |
| inorganic filler | SC2050 SMJ 525 CFP007ST | — | 80 | 80 | 80 | 80 | 80 | 80 | 80 |
| solvent | toluene:MEK = 4:1 | — | Y*1.25 | Y*1.25 | Y*1.25 | Y*1.25 | Y*1.25 | Y*1.25 | Y*1.25 |

| Property | Unit | C8 | C9 | C10 | C11 | C12 | C13 | C14 |
|---|---|---|---|---|---|---|---|---|
| Df1 | — | 0.00209 | 0.00227 | 0.00305 | 0.00195 | 0.00203 | 0.00205 | 0.00193 |
| Df2 | — | 0.00258 | 0.00285 | 0.00358 | 0.00213 | 0.00210 | 0.00222 | 0.00198 |
| difference rate of dissipation factor | % | 23.4% | 25.6% | 17.4% | 9.2% | 3.4% | 8.3% | 2.6% |
| S/G1 | second | 145 | 245 | 115 | 160 | 165 | 165 | 105 |
| S/G2 | second | 130 | 242 | 87 | 156 | 163 | 162 | 62 |
| gel time stability | second | 15 | 3 | 28 | 4 | 2 | 3 | 43 |
| stickiness | — | LV3 | LV3 | LV1 | LV1 | LV3 | LV1 | LV1 |

Samples (specimens) for the properties measured above were prepared as described below and tested and analyzed under specified conditions below.

(1) Prepreg (PP): Resin composition (in part by weight) from each Example (E1-E14) or each Comparative Example (C1-C14) was separately added to a stirred tank and well-mixed to form a varnish. Then the varnish was loaded to an impregnation tank, and a fiberglass fabric (e.g., 1078 L-glass fiber fabric, available from Asahi) was impregnated into the impregnation tank to adhere the resin composition onto the fiberglass fabric, followed by heating at 130° C. to 150° C. to the semi-cured state (B-stage) to obtain a prepreg, having a resin content of about 70%.

(2) Copper-containing laminate 1 (i.e., copper-clad laminate 1, formed by lamination of two prepregs): Two 18 μm HVLP (hyper very low profile) copper foils and two prepregs obtained from 1078 L-glass fiber fabrics impregnated with each Example or Comparative Example were prepared, each prepreg having a resin content of about 70%. A copper foil, two prepregs and a copper foil were superimposed in such order and then subjected to a vacuum condition for lamination at the pressure of 500 psi and at 200° C. for 150 minutes to form a copper-containing laminate 1. Insulation layers were formed by laminating two sheets of prepreg between the two copper foils, and the resin content of the insulation layers is about 70%.

(3) Copper-free laminate 1 (formed by lamination of two prepregs): Each aforesaid copper-containing laminate 1 was etched to remove the two copper foils to obtain a copper-free laminate 1 (formed by lamination of two prepregs), having a resin content of about 70%.

(4) Copper-containing laminate 2 (i.e., copper-clad laminate 2, formed by lamination of two prepregs): Two 18 μm HVLP (hyper very low profile) copper foils and two prepregs obtained from 1078 L-glass fiber fabrics impregnated with each Example or Comparative Example were prepared, each prepreg having a resin content of about 70%. A copper foil, two prepregs and a copper foil were superimposed in such order and then subjected to a vacuum condition for lamination at the pressure of 500 psi and at 200° C. for 150 minutes. After the laminate was cooled, the next lamination was then performed according to the same conditions as described above, wherein the cooling and lamination steps were repeated eight times respectively, and nine times of lamination in total were performed to form a copper-containing laminate 2. Insulation layers were formed by laminating two sheets of prepreg between the two copper foils, and the resin content of the insulation layers is about 70%.

(5) Copper-free laminate 2 (formed by lamination of two prepregs): Each aforesaid copper-containing laminate 2 was etched to remove the two copper foils to obtain a copper-free laminate 2 (formed by lamination of two prepregs), having a resin content of about 70%.

Test items and test methods are described below.

Difference Rate of Dissipation Factor

The aforesaid copper-free laminate 1 (obtained by laminating two prepregs, having a resin content of about 70%) and copper-free laminate 2 (obtained by laminating two prepregs, having a resin content of about 70%) were subjected to the measurement of difference rate of dissipation factor. Two samples were measured by reference to IPC-TM-650 2.5.5.13 at room temperature (about 25° C.) and at 10 GHz. The copper-free laminate 1 was measured to obtain a first dissipation factor defined as Df1, and the copper-free laminate 2 was measured to obtain a second dissipation factor defined as Df2. The difference rate of dissipation factor (%) is defined as the ratio of increase of the second dissipation factor (Df2) relative to the first dissipation factor (Df1). That is, the difference rate of dissipation factor is equal to $[(Df2-Df1)/Df1]*100\%$.

In the technical field to which the present disclosure pertains, lower difference rate of dissipation factor is better. A difference in difference rate of dissipation factor of greater than or equal to 2% represents a substantial difference (i.e., significant technical difficulty) in difference rate of dissipation factor in different laminates. For example, articles made from the resin composition disclosed herein have a difference rate of dissipation factor calculated according to a dissipation factor as measured by reference to IPC-TM-650 2.5. 5.13 at 10 GHz of less than or equal to 4.1%, such as between 1.6% and 4.1%.

Gel Time Stability

Resin composition (in part by weight) from each Example (E1-E14) or each Comparative Example (C1-C14) was separately added to a stirred tank and well-stirred and mixed to form a varnish, which was subjected to the measurement by reference to IPC-TM-650 2.3.18. 50 mL of each sample was placed on a cure plate of 171±0.5° C., the tapered end of a stick was stroked circularly from the center of the varnish sample toward the periphery, and the diameter of varnish area was maintained at 1.90 to 2.19 cm. Stroking was continued when the varnish became stiff until the largest piece broke up, and the timer was stopped immediately to record the time, unit being accurate to second, which was the first gel time defined as S/G1. After each sample was placed at room temperature (25° C.) for 7 days, the varnish of each sample was well mixed and stirred to make the inorganic filler in the resin composition uniformly disperse instead of settling at the bottom of the sample, and then measured according to the aforementioned gel time measurement method to obtain the second gel time defined as S/G2. Gel time stability is defined as the variation ($\Delta S/G$) between the second gel time and the first gel time. That is, gel time stability is equal to the second gel time minus the first gel time (S/G2−S/G1).

In the technical field to which the present disclosure pertains, lower gel time variation ($\Delta S/G$) represents better gel time stability. A difference in gel time stability of greater than or equal to 10 seconds represents a substantial difference (i.e., significant technical difficulty) in gel time stability in different varnishes. For example, articles made from the resin composition disclosed herein have a gel time stability calculated according to a gel time as measured by reference to IPC-TM-650 2.3.18 of less than or equal to 18 seconds, such as between 1 second and 18 seconds.

Stickiness

The prepreg was cut to a sheet size of 7 inch×10 inch, and a total of 2 sheets was prepared to measure the peel-off time of a single prepreg. The process of the stickiness test was to stack 2 prepregs and then stand them upright at the same time, and the time required for one prepreg to be peeled off from the other prepreg (i.e., the two prepregs were completely separated) was recorded by visual inspection. A set of 3 measurements were recorded, and the average thereof was calculated. In the present disclosure, the result of the stickiness test is defined as follows:

Level 1 (LV1): Starting from standing upright, without external forces, the two prepregs are peeled off within 0-3 seconds without powder falling.

Level 2 (LV2): A 2-gram weight is clamped on any corner of any single prepreg (i.e., the first method of applying external force), starting from the release of the weight, under the existence of gravity, the prepreg clamped with the weight is peeled off from the other prepreg within 0-3 seconds without powder falling.

Level 3 (LV3): A 2-gram weight is clamped on any corner of any single prepreg, starting from the release of the weight, under the existence of gravity, the prepreg clamped with the weight is peeled off from the other prepreg within 4-6 seconds without powder falling.

Level 4 (LV4): A 4-gram weight is clamped on any corner of any single prepreg (i.e., the second method of applying external force), starting from the release of the weight, under the existence of gravity, the prepreg clamped with the weight is peeled off from the other prepreg within 0-3 seconds without powder falling.

Level 5 (LV5): A 4-gram weight is clamped on any corner of any single prepreg, starting from the release of the weight, under the existence of gravity, the prepreg clamped with the weight is peeled off from the other prepreg within 4-6 seconds with powder falling.

The following observations can be made from Table 1 to Table 4.

Resin compositions comprising 120 parts by weight of a vinyl group-containing polyphenylene ether resin, 5 parts by weight to 10 parts by weight of a compound of Formula (1), 15 parts by weight to 25 parts by weight of a compound of Formula (2) and 70 parts by weight to 110 parts by weight of an inorganic filler, such as Examples E1-E14, can all achieve at the same time the properties including a difference rate of dissipation factor of less than or equal to 4.1%, a gel time stability of less than or equal to 18 seconds and passing a level 1 stickiness test. In contrast, Comparative Examples C1-C14 fail to achieve desirable results in at least one of the above-mentioned properties.

In contrast to Example E6, if the resin composition does not contain the compound of Formula (1) of the present disclosure but contains other coupling agents, such as Comparative Examples C1-C4, it will fail to achieve desirable improvement in difference rate of dissipation factor.

In contrast to Example E6, if the resin composition does not contain the compound of Formula (2) of the present disclosure, such as Comparative Examples C5-C10, it will fail to achieve desirable improvement in at least one of the properties including difference rate of dissipation factor, gel time stability and stickiness.

In contrast to Examples E6-E7, if the resin composition does not contain the compound of Formula (1) in an amount specified according to the present disclosure, such as Comparative Examples C11-C12, it will fail to achieve desirable improvement in at least one of the properties including difference rate of dissipation factor and stickiness.

In contrast to Examples E8-E9, if the resin composition does not contain the compound of Formula (2) in an amount specified according to the present disclosure, such as Comparative Examples C13-C14, it will fail to achieve desirable improvement in at least one of the properties including difference rate of dissipation factor and gel time stability.

Overall, the resin composition of the present disclosure or articles made therefrom may achieve at the same time desirable properties including a difference rate of dissipation factor of less than or equal to 4.1%, a gel time stability of less than or equal to 18 seconds and passing a level 1 stickiness test.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising 120 parts by weight of a vinyl group-containing polyphenylene ether resin, 5 parts by weight to 10 parts by weight of a compound of Formula (1), 15 parts by weight to 25 parts by weight of a compound of Formula (2), and 70 parts by weight to 110 parts by weight of an inorganic filler,

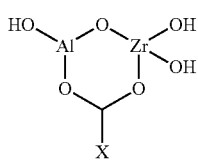

Formula (1)

wherein X is —(CH$_2$)$_n$CH$_3$ or —C(CH$_3$)=CH$_2$, and n is 13;

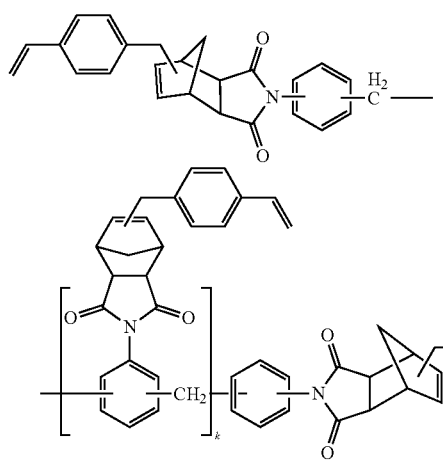

Formula (2)

wherein k is an integer of 1 to 10.

2. The resin composition of claim 1, wherein the vinyl group-containing polyphenylene ether resin comprises a vinylbenzyl group-containing biphenyl polyphenylene ether resin, a methacrylate group-containing polyphenylene ether resin or a combination thereof.

3. The resin composition of claim 1, wherein the inorganic filler comprises chemically synthesized silica, fused silica, boron nitride or a combination thereof.

4. The resin composition of claim 1, further comprising bis(vinylphenyl)ethane, maleimide resin, or a combination thereof.

5. The resin composition of claim 1, further comprising curing accelerator, flame retardant, polymerization inhibitor, solvent, coloring agent, toughening agent or a combination thereof.

6. An article made from the resin composition of claim 1, comprising a prepreg, a resin film, a laminate or a printed circuit board.

7. The article of claim 6, having a difference rate of dissipation factor of less than or equal to 4.10% calculated according to a dissipation factor as measured by reference to IPC-TM-650 2.5.5.13 at 10 GHz.

8. The article of claim 6, having a gel time stability calculated according to a gel time as measured by reference to IPC-TM-650 2.3.18 of less than or equal to 18 seconds.

9. The article of claim 6, characterized by passing a level 1 stickiness test.

* * * * *